J. TINGLEY.
Boot and Shoe Heel.
No. 209,944. Patented Nov. 12, 1878.
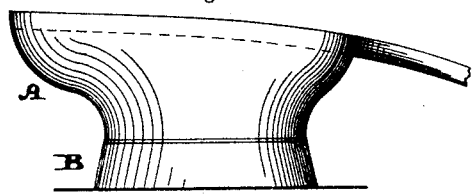
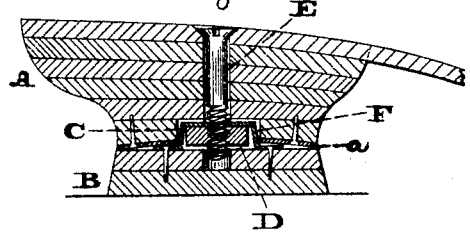
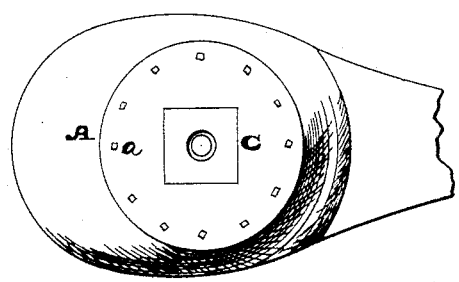
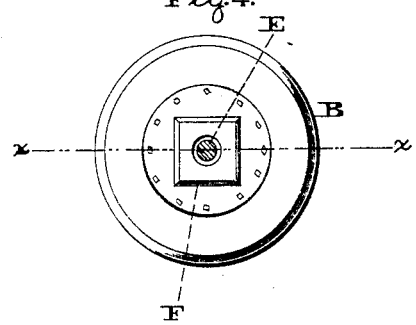
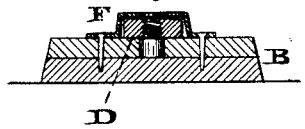
Witnesses:
A. P. Grant,
W. F. Kircher
Inventor:
John Tingley,
by John A. Diedersheim
ATTORNEY.

UNITED STATES PATENT OFFICE.

JOHN TINGLEY, OF PHILADELPHIA, PENNSYLVANIA.

IMPROVEMENT IN BOOT AND SHOE HEELS.

Specification forming part of Letters Patent No. 209,944, dated November 12, 1878; application filed April 10, 1878.

*To all whom it may concern:*

Be it known that I, JOHN TINGLEY, of the city and county of Philadelphia, and State of Pennsylvania, have invented a new and useful Improvement in Boot and Shoe Heels, which improvement is fully set forth in the following specification and accompanying drawings, in which—

Figure 1 is a side elevation of the heel embodying my invention. Fig. 2 is a central vertical section thereof. Fig. 3 is a bottom view of the upper portion thereof. Fig. 4 is a top view of the lower portion or tread. Fig. 5 is a vertical section in line $x\ x$, Fig. 4.

Similar letters of reference indicate corresponding parts in the several figures.

My invention relates to heels for boots or shoes which have been composed of two parts so secured together that when the lower part or tread becomes worn it can be detached from the upper portion, partially revolved, and again secured, whereby the wear will be equally distributed upon the under surface of the heel.

My improvement consists in means for securing the said parts of the heel together, the same being composed of a struck-up angular-shaped metallic plate fitted within an angular-shaped recess within the upper portion of the heel and combined with a nut and a screw, substantially as hereinafter more fully described.

Referring to the drawings, A represents the upper or fixed portion of the heel, and B the tread, which is movable, in order to change the surface when worn, said portion A and tread B being held together by a screw, E, which is inserted from above through the sole, and passing through the portion A engages with the tread B.

On the under face of the portion A there is an angular socket, C, said face being covered by a metallic plate, $a$, secured thereto, and having an opening in its center corresponding with the socket C.

D represents a nut, which is applied to the upper face of the tread B, and secured thereto by a plate, F, stamped or struck up so as to cover the nut, excepting the opening thereof, the plate being firmly connected to the tread, and the contour of the nut being that of the socket C.

The operation is as follows: The screw or bolt E is fitted to the nut D, and when tightened it clamps the tread B to the portion A of the heel, the nut D entering the socket C. This prevents the rotation or rotary shifting of the tread, and holds the parts A B solid as one.

When the tread is worn, the screw is removed or loosened until the nut D emerges from the socket C. Then turn the tread, press the nut into the socket, tighten the screw, and a fresh surface is presented for walking purposes.

It will be noticed that while accidental turning of the tread is prevented, the nut and socket form a connection between the tread and fixed portion of the heel, which prevents overturning or lateral strain of the tread, whereby the heel may be worn with safety.

The plate $a$ strengthens the base or under face of the portion A, and also the sides of the socket C.

The plate F provides a firm connection for the nut D, which is subjected to considerable strain and wear.

The head of the screw E is sunken in the sole, and as it is removed from the ground it is not liable to wear or become clogged, besides producing a flush surface which will not hurt the feet of the wearer. Moreover, the screw may be conveniently operated from the inside, and with greater cleanliness than if occupying a reversed position.

Having thus described my invention, what I claim as new, and desire to secure by Letters Patent, is—

1. The angular-shaped plate F, secured to the lower portion, B, of the heel, and inclosing a nut upon the screw E, in combination with the upper portion or foundation of the heel, formed with an angular-shaped recess adapted to receive the plate F, substantially as herein shown and described, and for the purposes set forth.

2. The combination and arrangement of the two parts of a boot or shoe heel, with plate F and screw E passing through the upper portion of the heel and down through plate F into the lower portion, B, said plate being fitted in an angular-shaped recess, substantially as shown and described.

JOHN TINGLEY.

Witnesses:
JOHN A. WIEDERSHEIM,
H. E. GARSED.